UNITED STATES PATENT OFFICE.

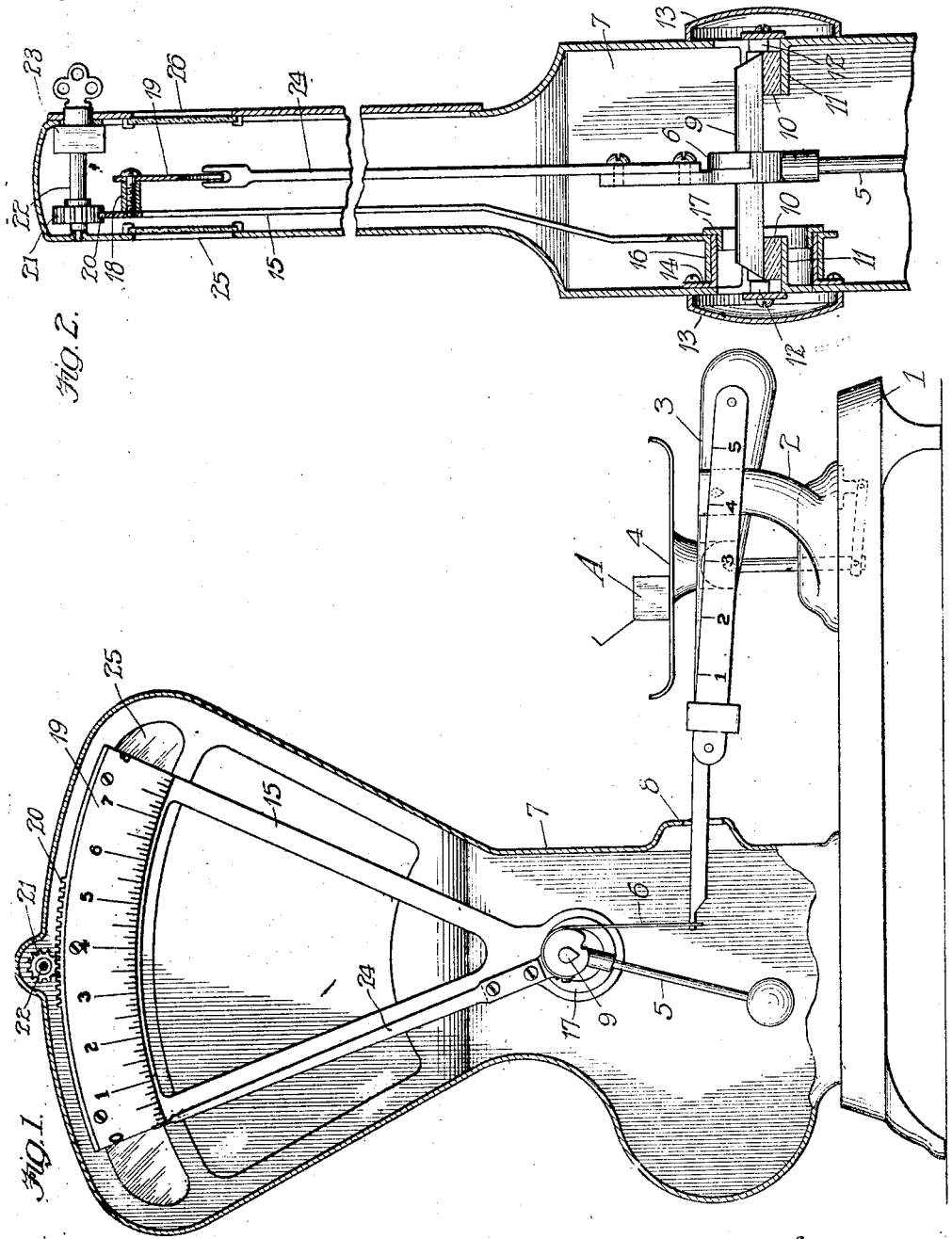

LEWIS CALVIN WETZEL, OF TOLEDO, OHIO, ASSIGNOR, BY MESNE ASSIGNMENTS, TO TOLEDO SCALE COMPANY, OF TOLEDO, OHIO, A CORPORATION OF NEW JERSEY.

WEIGHING-SCALE.

1,253,318.   Specification of Letters Patent.   Patented Jan. 15, 1918.

Application filed March 17, 1913. Serial No. 754,734.

*To all whom it may concern:*

Be it known that I, LEWIS C. WETZEL, a citizen of the United States, residing at Toledo, in the county of Lucas and State of Ohio, have invented certain new and useful Improvements in Weighing-Scales, of which the following is a specification.

My invention relates more particularly to an adjustable chart which may be adjusted either for the purpose of correcting the zero position thereof, or, and this is the more important function, for taking out tare in case the scale is used for weighing substances in the packages into which they are put for transportation. In the accompanying drawings and in the following specification I have disclosed in detail a preferred form of my invention as applied to a pendulum scale but it will be readily apparent that it may be variously embodied in the same and many other forms of scale, the detailed disclosure in connection with a pendulum scale being for the purpose of exemplification only and the scope of the invention being set forth in the following claims in which I have attempted to distinguish it from the prior art without, however relinquishing or abandoning any portion thereof.

In the drawings Figure 1 is a side elevation of the preferred form of the invention as applied to a pendulum scale as stated above and Fig. 2 a central vertical section at right angles to the plane of Fig. 1. The same reference numeral is applied to each part throughout the drawings and specification.

The base 1, horns 2, lever 3, scale pan 4 and pendulum 5 and connection 6 are or may be of any well-known or preferred form and the pendulum and connection are inclosed in a housing 7 into which the lever 3 projects through an opening 8. The housing is in general of the usual form but is slightly modified in respects hereinafter mentioned to adapt it to my invention. The pendulum as usual is suspended from a knife 9 supported on bearings 10, 10 which are held in seats 11, 11 formed integral with and projecting inwardly from the casing. Openings 12, 12 are formed in the casing opposite and above the seats and coverplates 13, 13 are arranged over the openings when the pendulum has been properly adjusted. A hollow cylindrical boss 14 is secured about one of the openings 12, 12 and concentric with the axis of oscillation of the pendulum and upon the boss is pivotally mounted a frame 15, the sleeve 16 of which surrounds the boss and is capable of oscillation with reference thereto, there preferably being a slight degree of friction between these parts to prevent too ready movement of the frame. A flanged ring 17 secured within the hollow boss 14 projects over the end of sleeve 16 and prevents its displacement from the boss. The frame 15 is sector shaped, as shown in Fig. 1, and along its curved upper edge carries a series of posts or studs 18 upon which is concentrically mounted the arcuate graduated scale 19 bearing the usual weight indications. Upon its upper edge the frame 15 is provided with a rack 20 with which meshes a pinion 21 mounted upon a shaft 22 journaled in the upper part of the casing. The rack and pinion are for the purpose of adjusting the graduated arc or chart, and for this purpose the end of the shaft 22 upon the operator's side of the scale is secured to the revoluble member of a barrel lock 23 of any usual or preferred type, so that by the insertion of the key thereof the shaft 22 and the pinion 21 may be turned to adjust the chart and yet the scale is proof in this respect against tampering by unauthorized persons. The arc 19 is situated mid-way between the front and back walls of the casing and is spanned or embraced by the bifurcated end of the weight indicator or pointer 24 which coöperates with the graduations upon the opposite sides of the arc and is visible from both sides of the scale through the openings 25, 26 in the rear and front of the casing respectively.

The operation of the device will be apparent to anyone familiar with the use of scales. When an article is to be weighed without the package therefor it is placed on the scale pan and its weight ascertained in the usual manner without the manipulation of the scale chart which normally occupies a zero position. When, however, an article is to be weighed in a container such as the box A shown in Fig. 1, the latter is put upon the scale pan and the pointer moved thereby from the zero position. The chart is then turned by means of the rack and pinion until its zero position corresponds to the new position of the indicator hand. The commodity is now filled into the receptacle to the amount desired which may be directly read from the chart, the weight of the vessel or tare being in this manner eliminated.

I claim:

1. A weighing scale comprising a pivoted indicator hand, a chart pivoted concentrically with the indicator hand and having a rack upon the arcuate edge thereof, a pinion meshing with the rack for adjusting the chart, a shaft upon which the pinion is mounted and a lock the revoluble member of which is connected to the shaft for rotating the same.

2. In a weighing scale and in combination with the beam, load receiver and pendulum thereof, a bifurcated weight indicator connected to and movable with the pendulum, a hollow boss surrounding one of the pendulum bearings, a sleeve rotatable upon the boss, a frame connected to the sleeve, an arcuate chart carried by the frame and extending between the forks of the bifurcated indicator, a rack upon the arcuate edge of the frame, a pinion meshing with the rack and means for revolving the pinion.

3. In an automatic weighing scale, a casing, an indicator hand, a frame pivoted upon the casing concentric with the pivot of the hand and having a rack upon the edge thereof in a plane perpendicular to the pivot of said frame and hand, a shaft journaled in the casing carrying a pinion coöperating with said rack, posts projecting from said frame, and a chart concentric with said pivots and carried by the posts.

4. In an automatic weighing scale, a casing, bearing blocks mounted in the front and rear walls respectively of the casing, an indicator having a knife resting upon said bearing blocks, a hollow boss or sleeve arranged upon one of the walls of the casing surrounding the bearing carried thereby, a pivoted frame journaled upon said boss, means for swinging said frame about its journal, and a chart carried by said frame.

5. In an automatic weighing scale and in combination with the casing thereof, bearings formed in the casing, an indicator hand, a knife carrying the indicator hand and mounted on said bearings, a sleeve secured to one of said walls concentric to the bearing thereof and projecting inwardly therefrom, a frame having a hollow sleeve surrounding the sleeve on the casing, means for securing the sleeves from relative endwise movement, means for oscillating the frame comprising a rack and pinion, and a chart carried by said frame.

LEWIS CALVIN WETZEL.

Witnesses:
CLARENCE W. FESSENDEN,
SAM G. CRANE.